(12) United States Patent
Alonzo et al.

(10) Patent No.: US 12,188,607 B1
(45) Date of Patent: Jan. 7, 2025

(54) COMPACT SUPPORT STAND FOR A PORTABLE ELECTRONIC DEVICE

(71) Applicants: Reynaldo V. Alonzo, Fresno, CA (US); Nina Seyedabadi, Fresno, CA (US)

(72) Inventors: Reynaldo V. Alonzo, Fresno, CA (US); Nina Seyedabadi, Fresno, CA (US)

( * ) Notice: Subject to any disclaimer, the term of this patent is extended or adjusted under 35 U.S.C. 154(b) by 0 days.

(21) Appl. No.: 17/939,679

(22) Filed: Sep. 7, 2022

(51) Int. Cl.
*F16M 13/00* (2006.01)
*F16M 11/04* (2006.01)
*F16M 11/08* (2006.01)

(52) U.S. Cl.
CPC .......... *F16M 13/00* (2013.01); *F16M 11/041* (2013.01); *F16M 11/08* (2013.01)

(58) Field of Classification Search
CPC ........ F16M 11/041; F16M 13/00; H04M 1/04
USPC ............................................ 248/316.7, 316.5
See application file for complete search history.

(56) References Cited

U.S. PATENT DOCUMENTS

| | | | | |
|---|---|---|---|---|
| 3,456,262 A * | 7/1969 | Coon | ................ | D06F 55/00 24/511 |
| 5,325,570 A * | 7/1994 | Chin-Ho | ................ | D06F 55/00 24/511 |
| 5,361,463 A * | 11/1994 | Revis | ................ | A44B 99/00 24/543 |
| 5,402,558 A * | 4/1995 | Santapa | ................ | A47G 25/485 24/511 |
| 5,590,860 A * | 1/1997 | Fan | ................ | F16M 13/005 24/3.12 |
| 5,697,071 A | 12/1997 | Fan | | |
| 5,836,563 A | 11/1998 | Hsin-Young | | |
| 6,772,879 B1 | 8/2004 | Domotor | | |
| 7,513,472 B2 * | 4/2009 | Yang | ................ | F16M 11/041 248/316.1 |
| 7,673,745 B2 | 3/2010 | Sirichai | | |
| D637,393 S | 5/2011 | Stampfli | | |
| D644,428 S | 9/2011 | Feng | | |
| 8,146,875 B2 * | 4/2012 | Pryor | ................ | F16B 2/20 24/546 |
| 8,576,557 B2 * | 11/2013 | Chu | ................ | F16M 11/041 361/679.55 |
| 8,631,934 B2 | 1/2014 | Chun | | |
| 9,155,213 B2 * | 10/2015 | Jones | ................ | H04M 1/04 |
| D756,346 S * | 5/2016 | Kim | ................ | D14/253 |
| 9,398,793 B2 | 7/2016 | Marin | | |
| D768,125 S | 10/2016 | Kim | | |
| 9,695,849 B2 * | 7/2017 | Zhou | ................ | F16M 11/041 |
| D822,581 S * | 7/2018 | Jung | ................ | D12/415 |
| 10,113,689 B2 * | 10/2018 | Oh | ................ | F16M 11/041 |

(Continued)

FOREIGN PATENT DOCUMENTS

| | | |
|---|---|---|
| CN | 205395873 | 7/2016 |
| WO | WO 2016/056721 | 4/2016 |

*Primary Examiner* — Bradley Duckworth
(74) *Attorney, Agent, or Firm* — Kenneth L Tolar

(57) ABSTRACT

A support stand for a portable electronic device includes a clip having a pair of planar jaws, each having an upper end, a lower end, an inner surface, and an outer surface. The lower ends of the jaws are integrally joined by a uniquely designed hinge mechanism that biases the jaws in a closed orientation that allows the jaws to expand to fit around and tightly grip a desired electronic device. When the jaws are detached from the electronic device, the hinge mechanism forces the jaws into a collapsed, flat orientation, allowing the clip to be easily transported and stored.

10 Claims, 1 Drawing Sheet

(56) References Cited

U.S. PATENT DOCUMENTS

| | | | |
|---|---|---|---|
| 10,226,117 B1 * | 3/2019 | Baxter | F16M 13/04 |
| 11,408,552 B2 * | 8/2022 | Li | F16M 13/022 |
| 2003/0182773 A1 * | 10/2003 | Ellwood | F16B 2/10 |
| | | | 24/334 |
| 2005/0086776 A1 * | 4/2005 | Bergmark | A61C 15/02 |
| | | | 24/545 |
| 2011/0025176 A1 | 2/2011 | McClure et al. | |
| 2012/0224305 A1 | 9/2012 | Yoo | |
| 2014/0131250 A1 | 5/2014 | Chun | |
| 2015/0195392 A1 * | 7/2015 | Nissenbaum | H04M 1/04 |
| | | | 455/569.1 |
| 2019/0301671 A1 * | 10/2019 | McGuyer | H04B 1/3827 |

\* cited by examiner

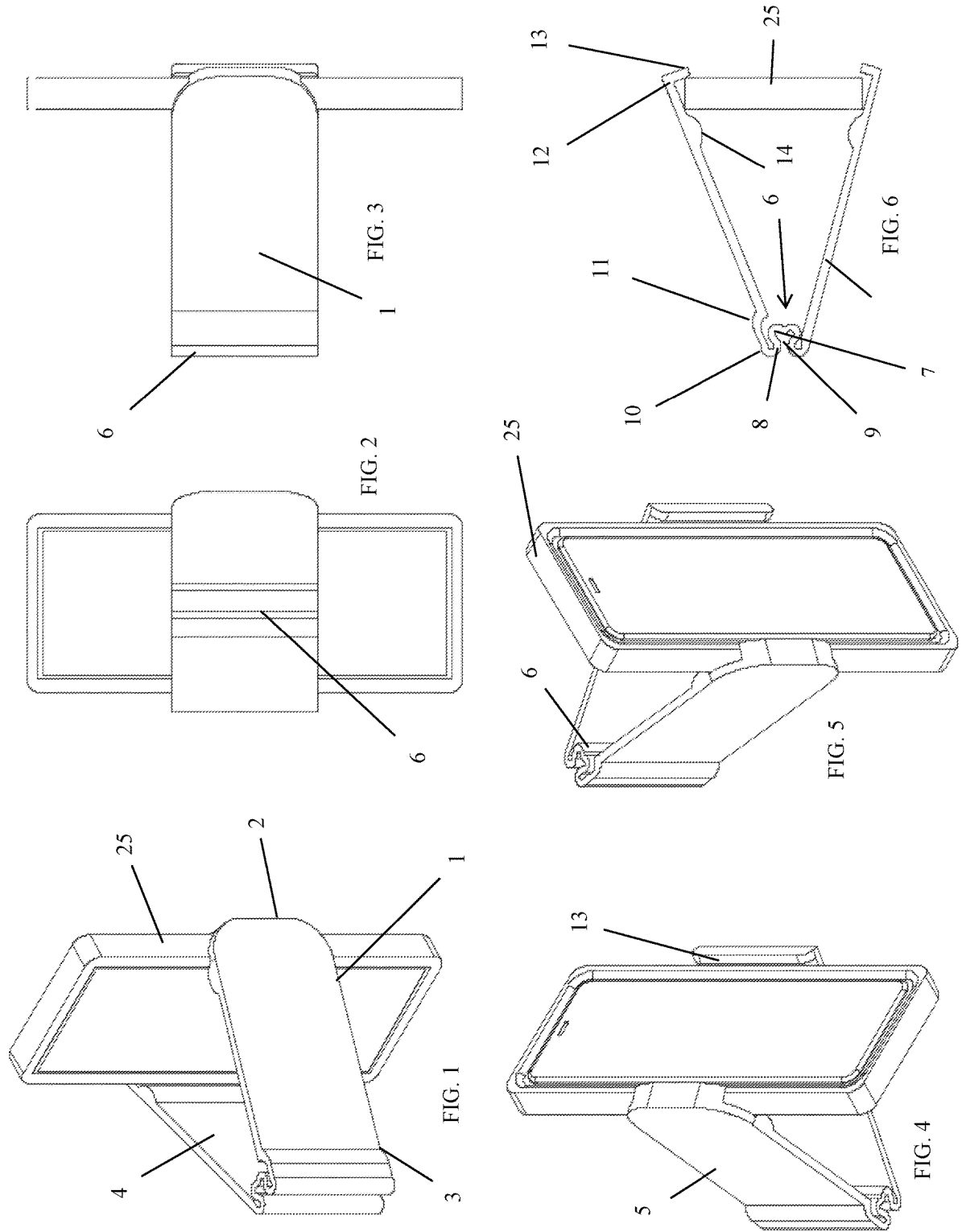

COMPACT SUPPORT STAND FOR A PORTABLE ELECTRONIC DEVICE

CROSS REFERENCE TO RELATED APPLICATIONS

None.

BACKGROUND OF THE INVENTION

The present invention relates to a versatile support stand that supports a portable electronic device in a variety of desired positions.

DESCRIPTION OF THE PRIOR ART

Electronic readers (e-readers), tablet computers, wireless phones and other similar portable electronic devices are universally used to perform numerous routine tasks. Nearly all controls of the portable electronic device are depicted on a touch-screen display that must be readily viewable and accessible when performing a certain task. However, portable electronic devices are not typically equipped with integral support stands for positioning the display screen at a more visible position. Accordingly, the user often holds the device upright, which occupies a hand that could be used for other tasks and is burdensome and inconvenient. Otherwise, the device is supported on the user's lap, a desk, a table, or another horizontal support surface where the device is cumbersome to operate and difficult to view.

Furthermore, portable electronic devices vary in size, shape, configuration, and dimension. Therefore, each type of electronic device requires a designated, specifically configured support stand that is typically unsuitable for any other type of electronic device. Additionally, most conventional support stands are bulky, include numerous interconnected components that must be assembled, and are difficult to transport and store.

Accordingly, there is currently a need for a compact, lightweight stand that can uprightly support a variety of electronic devices at a desired orientation. The present invention addresses this need by providing a resilient but expandable clip that firmly grips and uprightly supports a portable electronic device.

SUMMARY OF THE INVENTION

The present invention relates to a support stand for a portable electronic device comprising a clip having a pair of planar jaws, each having an upper end, a lower end, an inner surface, and an outer surface. The lower ends of the jaws are integrally joined by a uniquely designed hinge mechanism that biases the jaws in a closed orientation to allow the jaws to expand to fit around and tightly grip a desired electronic device. When the jaws are detached from the electronic device, the hinge mechanism forces the jaws into a collapsed, flat orientation, allowing the clip to be easily transported and stored.

It is therefore an object of the present invention to provide an electronic device support stand that is compact, lightweight, and versatile.

It is another object of the present invention to provide an electronic device support stand that automatically collapses for storage when detached from the electronic device.

It is yet another object of the present invention to provide an electronic device support stand that uprightly supports an electronic device in various orientations.

Other objects, features, and advantages of the present invention will become readily apparent from the following detailed description of the preferred embodiment when considered with the attached drawings and the appended claims.

BRIEF DESCRIPTION OF THE DRAWINGS

FIG. 1 is a perspective view of the support stand according to the present invention supporting an electronic device in a first orientation.

FIG. 2 is a lower end view of the support stand of FIG. 1.

FIG. 3 is a side view of the support stand of FIG. 1.

FIG. 4 is a lower, perspective view of the support stand of FIG. 1.

FIG. 5 is a perspective view of the support stand according to the present invention supporting an electronic device in a second orientation.

FIG. 6 is a top view of the support stand retaining a portable electronic device.

DESCRIPTION OF THE PREFERRED EMBODIMENT

The present invention relates to a support stand for a portable electronic device 25 comprising a clip having a pair of planar jaws 1, each having an upper end 2, a lower end 3, an inner surface 4, and an outer surface 5. The planar outer surface of each jaw easily accommodates magnets, logos, design elements, identifying placards or other desired indicia.

The lower ends of the jaws are integrally joined by hinge mechanism 6 that biases the jaws in a closed or collapsed orientation. The hinge mechanism includes a central, heart-shaped, open collar 7 having a pair of spaced ends 8 that define an opening 9. Each spaced end includes an upturned, U-shaped connector 10 that extends to the lower end of one of the jaws. The uniquely designed hinge mechanism allows the jaws to expand with the application of a predetermined amount of force to fit around and tightly grip a desired electronic device without the need for springs or other complex biasing mechanisms. When the jaws are detached from the electronic device, the hinge mechanism forces the jaws into a collapsed, flat orientation, allowing the clip to be easily transported and stored. One or both connectors could have an inwardly curved portion 11 that positions the corresponding jaw closer to a central axis of the clip to form a flatter configuration when the clip collapses.

At the upper end of each jaw is an L-shaped retainer 12 having an inwardly extending leg 13 for engaging the front or rear surface of the electronic device. A mound 14 positioned a predetermined distance from the retainer engages the opposing surface of the electronic device. Accordingly, the biased jaws securely retain the electronic device between the mound and retainer. The user can then position the clip on an underlying support surface to uprightly position the electronic device at a desired angle.

The above-described device is not limited to the exact details of construction and enumeration of parts provided herein. Furthermore, the size, shape and materials of construction of the various other components can also be varied.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A support stand for a portable electronic device comprising:
   a clip formed of a pair of planar jaws, each of said planar jaws having an upper free end, a lower end, an inner surface, and an outer surface;
   a biasing hinge mechanism integrally and pivotally joining the lower ends of the jaws, said hinge mechanism biasing said jaws in a collapsed orientation, wherein said biasing hinge mechanism comprises a central open collar having a pair of spaced ends that define an opening and an upturned U-shaped connector extending from each of said spaced ends to the lower end of one of said jaws, said hinge mechanism allowing said jaws to expand with an application of a predetermined amount of force to fit around and tightly grip the electronic device, and forcing the jaws into a collapsed, flat orientation when the jaws are detached from the portable electronic device for transport and storage;
   at least one of said connectors having an inwardly curved portion between said one of said connectors and the lower end of said jaw to reposition said jaw closer to a central axis of the clip to form a flat configuration when the clip collapses;
   a retainer at the upper end of each of said jaws for gripping a portable electronic device.

2. The support stand according to claim 1, wherein said retainer is L-shaped and includes an inwardly extending leg for engaging a first surface of the electronic device.

3. The support stand according to claim 1 further comprising a mound positioned a predetermined distance from said retainer for engaging an opposing, second surface of the electronic device.

4. The support stand according to claim 1 wherein said open collar is heart shaped.

5. The support stand according to claim 3 further comprising an electronic device positioned between said mound and said retainer.

6. A support stand for a portable electronic device comprising:
   a clip formed of a pair of planar jaws, each of said planar jaws having an upper free end, a lower end, an inner surface, and an outer surface;
   a biasing hinge mechanism integrally and pivotally joining the lower ends of the jaws, said hinge mechanism biasing said jaws in a collapsed orientation;
   a retainer at the upper end of each of said jaws for gripping a portable electronic device, wherein said hinge mechanism comprises a central open heart-shaped collar having a pair of spaced ends that define an opening andan upturned U-shaped connector extending from each of said spaced ends to the lower end of one of said jaws, said hinge mechanism allowing said jaws to expand with an application of a predetermined amount of force to fit around and tightly grip the electronic device, and forcing the jaws into a collapsed, flat orientation when the jaws are detached from the portable electronic device for transport and storage.

7. The support stand according to claim 6 wherein at least one of said connectors has an inwardly curved portion between said one of said connectors and the lower end of said jaw to reposition said jaw closer to a central axis of the clip to form a flat configuration when the clip collapses.

8. The support stand according to claim 6 wherein said retainer is L-shaped and includes an inwardly extending leg for engaging a first surface of the electronic device.

9. The support stand according to claim 6 further comprising a mound positioned a predetermined distance from said retainer for engaging an opposing, second surface of the electronic device.

10. The support stand according to claim 9 further comprising an electronic device positioned between said mound and said retainer.

* * * * *